(12) United States Patent
Jameson

(10) Patent No.: US 10,981,110 B2
(45) Date of Patent: Apr. 20, 2021

(54) ADSORBENT MATERIALS, APPARATUS, AND METHODS FOR REMOVAL OF HYDROGEN SULFIDE FROM GASES

(71) Applicant: Pure Air Filtration, LLC, Atlanta, GA (US)

(72) Inventor: Kevin F. Jameson, Atlanta, GA (US)

(73) Assignee: Pure Air Filtration, LLC, Atlanta, GA (US)

( * ) Notice: Subject to any disclaimer, the term of this patent is extended or adjusted under 35 U.S.C. 154(b) by 0 days.

(21) Appl. No.: 16/523,447

(22) Filed: Jul. 26, 2019

(65) Prior Publication Data
US 2019/0344219 A1 Nov. 14, 2019

Related U.S. Application Data

(63) Continuation of application No. 15/601,358, filed on May 22, 2017, now abandoned.

(51) Int. Cl.
| | |
|---|---|
| *B01J 20/20* | (2006.01) |
| *B01J 20/02* | (2006.01) |
| *B01J 20/04* | (2006.01) |
| *B01J 20/06* | (2006.01) |
| *B01J 20/12* | (2006.01) |
| *B01J 20/28* | (2006.01) |
| *B01J 20/32* | (2006.01) |
| *B01D 53/82* | (2006.01) |
| *B01D 53/52* | (2006.01) |
| *B01D 53/02* | (2006.01) |
| *B01D 53/83* | (2006.01) |

(52) U.S. Cl.
CPC ............. *B01D 53/82* (2013.01); *B01D 53/02* (2013.01); *B01D 53/52* (2013.01); *B01J 20/06* (2013.01); *B01J 20/12* (2013.01); *B01J 20/20* (2013.01); *B01J 20/2803* (2013.01); *B01J 20/28016* (2013.01); *B01J 20/28021* (2013.01); *B01J 20/28045* (2013.01); *B01J 20/3204* (2013.01); *B01J 20/3236* (2013.01); *B01D 53/83* (2013.01); *B01D 2251/404* (2013.01); *B01D 2251/408* (2013.01); *B01D 2251/602* (2013.01); *B01D 2253/102* (2013.01); *B01D 2253/106* (2013.01); *B01D 2253/11* (2013.01); *B01D 2253/1124* (2013.01); *B01D 2253/25* (2013.01); *B01D 2253/306* (2013.01); *B01D 2253/308* (2013.01); *B01D 2253/311* (2013.01); *B01D 2255/2042* (2013.01); *B01D 2255/2045* (2013.01); *B01D 2255/2047* (2013.01); *B01D 2255/2073* (2013.01); *B01D 2255/20738* (2013.01); *B01D 2257/304* (2013.01)

(58) Field of Classification Search
None
See application file for complete search history.

(56) References Cited

U.S. PATENT DOCUMENTS

| | | | | |
|---|---|---|---|---|
| 5,302,354 A | * | 4/1994 | Watvedt | B01D 46/002 210/493.1 |
| 8,263,524 B1 | * | 9/2012 | Skandan | B01J 20/20 428/403 |

* cited by examiner

*Primary Examiner* — Daniel Berns
(74) *Attorney, Agent, or Firm* — Thomas Horstemeyer, LLP

(57) ABSTRACT

An adsorbent composition, adsorbent apparatus, and gas purification process using the absorbent composition are provided for the removal of hydrogen sulfide from a gas containing at least hydrogen sulfide as an impurity. The adsorbent composition includes a combination of at least one carbon material, at least one clay material, and at least one metal oxide. In particular, the combination of carbon material(s), clay material(s) and metal oxide(s) provide for effective removal of hydrogen sulfide from a gas at a reduced cost.

8 Claims, No Drawings

ADSORBENT MATERIALS, APPARATUS, AND METHODS FOR REMOVAL OF HYDROGEN SULFIDE FROM GASES

CROSS REFERENCE TO RELATED APPLICATIONS

This application is a continuation of co-pending U.S. non-provisional application entitled "Adsorbent Materials, Apparatus and Methods for Removal of Hydrogen Sulfide from Gases" having Ser. No. 15/601,358, filed on May 22, 2017, which is hereby incorporated by reference in its entirety.

FIELD OF THE INVENTION

The present invention generally relates to an adsorbent composition and system, and more particularly to an adsorbent composition and system for the removal of hydrogen sulfide from a contaminated gas. In particular, the present invention relates to an adsorbent composition containing a combination of carbon, clay and one or more metal oxides.

BACKGROUND

Hydrogen sulfide, a colorless gas with the characteristic odor of rotten eggs, is a malodorous compound that is very poisonous, corrosive, flammable, and explosive. Although it is disagreeably odorous at first, it can deaden one's sense of smell by paralyzing the respiratory center of the brain and olfactory nerve and, thus, one may subsequently be unable to detect its presence after initial exposure. Exposure to hydrogen sulfide at heightened levels can cause rapid loss of consciousness and death.

Hydrogen sulfide occurs naturally, for example, in crude petroleum, natural gas, sour gases, salt mines, volcanic gases, hot sulfur springs, marine sediments, swamps and stagnant bodies of water. The human body also produces small amounts of hydrogen sulfide, particularly in the digestive tract where bacteria breaks down proteins containing sulfur. Hydrogen sulfide can also be found in sewage treatment facilities, in livestock barns, and manure. Further, hydrogen sulfide is produced as a by-product of many industrial operations, such as petroleum refineries, petrochemical plants, natural gas plants, and Kraft paper mills.

Hydrogen sulfide is one of many malodorous compounds that are considered environmental contaminants, some of which are subject to regulation because they can cause a variety of undesirable reactions in living organisms and the environment. Removal of hydrogen sulfide from municipal wastewater systems and other industries has been a focus for some time.

A variety of vapor-phase technologies have been developed to control malodorous compounds in the air and gas streams. For example, physio-chemical based methods have been developed, including absorption or wet scrubbing, adsorption, condensation, ozonation, and photo-catalytic oxidation. The particular method used in a given case is generally determined by the target compound(s) and their composition in the air or gas stream.

Adsorption-based systems are the most commonly used for the removal of malodorous compounds from the air and gas streams. In such systems, the contaminated air or gas stream is brought into contact with a solid adsorbent material that is designed to attract the target compounds. Adsorption can be characterized as either physical adsorption or chemisorption based on how the adsorbent material interacts with the adsorbate. In physical adsorption, the malodorous compounds are physically attracted to and held on the adsorbent material without chemical bonding. Physical adsorption involves weaker forces (e.g. van der Waals), which can allow for the subsequent removal of the adsorbate and regeneration of the adsorbent material for future use. Chemisorption involves a chemical reaction between the surface and the adsorbate, and is typically stronger and irreversible.

While adsorbent compositions have been developed targeting the removal of hydrogen sulfide from contaminated air and gas streams, improvements are still needed.

SUMMARY OF INVENTION

Aspects of the present invention are directed to an adsorbent composition for the removal of one or more contaminants from a gas or the air (hereinafter collectively referred to as "a gas") containing at least one contaminant, and a method for removing at least one contaminant from a gas using the adsorbent composition. Further provided is an adsorbent system containing the adsorbent composition for removal of at least one contaminant from a gas containing the at least one contaminant. More particularly, the present invention provides an adsorbent composition and system for the removal of hydrogen sulfide from a gas containing at least hydrogen sulfide as an impurity.

According to one aspect, the present invention provides an absorbent composition for the removal of hydrogen sulfide from a gas, the composition containing a combination of a carbon material, clay, and a metal oxide.

According to various embodiments, the adsorbent composition comprises at least one base material with at least one supported material disposed thereon. The at least one base material can comprise at least one carbon material and at least one clay material, and the at least one supported material can comprise at least one metal oxide. The adsorbent composition can comprise a first base material formed of at least one carbon material with at least one metal oxide supported material, and a second base material formed of at least one clay material with at least one metal oxide supported material. The at least one metal oxide can coat at least a surface of the at least one carbon material and the at least one clay material, can be impregnated or embedded in the at least one carbon material and the at least one clay material, can be physically or chemically bonded or adhered to at least one surface of the at least one carbon material and the at least one clay material, can be dispersed within the at least one carbon material and the at least one clay material, or a combination thereof. A carbon base material can be combined with at least one first metal oxide, and a clay base material can be combined with at least one second metal oxide. The carbon materials can be selected from the group consisting of carbon black, graphite and activated carbon. The composition can comprise about 60 wt % to about 80 wt % of the at least one carbon material and the at least one clay material, and about 20 wt % to about 40 wt % of the at least one metal oxide, wherein wt % is based on total weight of the adsorbent media composition. The adsorbent media composition can be in the shape of granules, powders, particles, pellets, cylinders, trochiodal shapes, flakes, beads, rings, irregular shapes, extruded structures, matrices, honeycomb structures, meshes, helixes and combinations thereof. The shapes can be a generally solid form, a partially hollow form, a completely hollow form, or a combination thereof.

According to another aspect, the present invention provides an apparatus for removal of hydrogen sulfide from a gas containing at least hydrogen sulfide as a contaminant, the apparatus comprising a reactive chamber having an interior volume, an inlet and outlet, and a gas flow path within the interior volume extending between the inlet and outlet; and an adsorbent media composition as described herein dispersed within the interior volume in the gas flow path. According to various embodiments, the reactive chamber can be in the form of a packed column, plate column, spray chamber, spray tower, or cyclonic spray chamber.

According to another aspect, the present invention provides a method for removal of hydrogen sulfide from a gas containing at least hydrogen sulfide as an impurity, the method comprising providing an adsorbent media composition described herein; contacting the gas with the adsorbent media composition; and allowing the adsorbent media composition to remove at least a portion of hydrogen sulfide from the gas via adsorption. According to various embodiments, the step of contacting the gas with the adsorbent media composition comprises passing the gas through a reaction chamber containing the adsorbent media therein. The reaction chamber can be in the form of a packed column, plate column, spray chamber, spray tower, or cyclonic spray chamber.

Other aspects, embodiments and advantages of the present invention will become readily apparent to those skilled in the art are discussed below. As will be realized, the present invention is capable of other and different embodiments without departing from the present invention. Thus the following description as well as any drawings appended hereto shall be regarded as being illustrative in nature and not restrictive.

DETAILED DESCRIPTION OF THE INVENTION

According to the present invention, an adsorbent composition is provided for the removal of one or more contaminants, malodorous compounds, or impurities (hereinafter collectively referred to as "contaminants") from a gas. The adsorbent composition can suitably be used for the removal of one or more contaminants from various process streams including, but not limited to, landfill gas, wastewater treatment gas, petroleum refineries, petrochemical plants, natural gas plants, and Kraft paper mills. The adsorbent composition is particularly useful for the removal of hydrogen sulfide from a gas containing at least hydrogen sulfide as a contaminant. Further provided are systems and methods for removing at least one contaminant from a gas, the systems and methods utilizing the described adsorbent composition.

As referred to herein, "removal" of one or more contaminants (e.g., hydrogen sulfide) from a gas refers to any extent of removal such that the gas prior to contact with the present adsorbent contains a greater level of the one or more contaminants than the gas after contact with the present adsorbent composition. Thus, removal is not limited to complete and total elimination of the one or more contaminants. It is, however, preferred that the extent of removal is at least about 50% removal of the target contaminant(s), more preferably at least about 60%, at least about 65%, at least about 70%, at least about 75%, at least about 80%, at least about 85%, at least about 90%, and even amounts of at least about 95%. Such removal results from the one or more materials forming the adsorbent composition interacting with the target contaminant(s) in the gas so as to hold, bind or otherwise physically and/or chemically adhere the target contaminant(s) and remove the target contaminant(s) from the gas by adsorption.

The adsorbent composition of the present invention includes (1) one or more carbon materials, (2) one or more clay materials, and (3) one or more metal oxides. These materials can be provided in any form that allows for removal of one or more contaminants from a gas. In particular, the materials are provided in a form that targets removal of hydrogen sulfide from a gas. It is noted that while removal of hydrogen sulfide is targeted by the present invention, additional contaminants can also be removed from the gas, if desired.

The carbon materials suitable for use in the present compositions can be selected from carbon black, graphite and activated carbon. Preferably, the carbon material(s) include activated carbon. Activated carbon has small, low-volume pores that increase the surface area of the material. Activated carbons are produced from a variety of sources including wood, coal, peat, coconut shells, and recycled tires. Activation of carbon produces internal pores and carbon surfaces that increase surface area, thus increasing adsorption sites in the material and enhancing adsorptive capacity. Activated carbon is commonly provided as 1-3 mm diameter beads, 2-4 mm diameter extruded pellets, powder, and granules. Powder activated carbon (PAC), generally comprises crushed or ground carbon particles having a size such that 95-100% of the particles pass through an 80-mesh sieve (0.177 mm) and smaller. Granular activated carbon (GAC) has a relatively larger particle size compared to powdered activated carbon. Any commercially available activated carbon can be used as the carbon material in the present invention. Further, such commercially available activated carbon materials could also be modified as desired for use in the present invention (e.g., by grinding down or crushing particles or pellets to provide different particle sizes and shapes than those commercially available). Activated carbons are capable of providing physical adsorption and chemical adsorption. As such, when used in the present compositions, they provide enhanced capability for removal of hydrogen sulfide and other contaminants from a gas.

The clays suitable for use in the present adsorbent compositions can be selected from any conventional clay materials. Such materials can be amorphous or crystalline, and can fall within one of the following groups: kaolinite, illite, smectite, and vermiculite.

In particular, it is preferable that the clays used in the present invention are provided with an adequate porosity to allow the contaminated gas to pass through the clay, and an adequate reaction surface area (also referred to as adsorptive surface area) to allow the contaminants in the gas to be adsorbed. Depending upon the environment in which the present adsorbent materials are used, including the amount and type of gas flow, the clay material can be tailored to provide for improved removal of contaminants by varying characteristics of the clay such as the porosity and reaction surface area. For example, in applications with a relatively large gas flow/flow rate, the clay that is used can be selected from those having a greater porosity to accommodate the large amount/flow rate of the gas. The reaction surface area may also be increased for such large gas flow/flow rates to allow for the adsorption of the increased amounts of contaminants that the adsorbent material will encounter with the larger gas flow/flow rate. Reaction surface area can also be adjusted depending upon the amount or concentration of contaminants. For example, in an environment in which a large amount of contaminated gas and/or a contaminated gas having a relatively high concentration of contaminants will come into contact with the adsorbent material, it may be beneficial to provide an increased reaction surface area to accommodate the larger amount of contaminants. An increased reaction surface area can also allow for the use of an adsorbent material for a longer period of time before the adsorbent material becomes saturated by contaminants and needs to be replaced. Further, in an environment in which the concentration of contaminants may be relatively low, it may be beneficial to provide an increased porosity and reaction surface area to increase the opportunity for the smaller amounts of contaminants to come into contact with and be removed by the adsorbent material.

According to various embodiments, the clay is provided with a reaction surface area of at least about 400 $m^2/g$, preferably at least about 500 $m^2/g$, preferably at least about 600 $m^2/g$, preferably at least about 700 $m^2/g$, and more preferably at least about 800 $m^2/g$. The clay further contains pores through which the contaminated gas passes. According to embodiments of the present invention, the pores through which the gas passes are in the form of mesopores (i.e., diameters between 2 and 50 nm) and/or macropores (i.e., diameters greater than 50 nm). The pore volume (i.e., ratio of the material's air volume to total volume) preferably ranges from about 0.1 $cm^3/g$ to about 0.5 $cm^3/g$, and in some embodiments is about 0.3 $cm^3/g$. It is noted that activated carbon is similar, but is ultra-porous, so it has similar characteristics but with a total aperture area that is about three times larger than those of the above noted clay values.

The metal oxides suitable for use in the present adsorbent compositions can be selected from any metal oxide that provides for adsorption of a target contaminant, particularly hydrogen sulfide. Exemplary metal oxides usable in the present compositions include, but are not limited to, oxides of iron (Fe), zinc (Zn), cobalt (Co), nickel (Ni), copper (Cu), lanthanum (La), cerium (Ce), calcium (Ca), magnesium (Mg), barium (Ba), beryllium (Be), strontium (Sr), radium (Ra), scandium (Sc), yttrium (Y), titanium (Ti), zirconium (Zr), hafnium (Hf), vanadium (V), niobium (Nb), tantalum (Ta), chromium (Cr), molybdenum (Mo), tungsten (W), manganese (Mn), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), and combinations thereof.

In one embodiment, the metal oxide is selected from the oxides of Fe, Mg, Ca, and Ba. In particular, iron, magnesium, calcium and barium compounds have been found to interact and react with sulfur compounds, and thus it is believed that the presence of one more of these metals in an oxide form allows for a stronger interaction with sulfur species, particularly hydrogen sulfide. In an exemplary embodiment, the metal oxides include a combination of magnesium oxide and $Fe_2O_3$ iron (III) oxide. Through the incorporation of the metal oxide material(s), the adsorbent media compositions provided by the present invention have an enhanced capacity for the adsorption of hydrogen sulfide, as well as other contaminants, from a gas containing at least hydrogen sulfide as an impurity.

According to an embodiment of the invention, the adsorbent composition generally comprises a mixture of the one or more carbon materials, clay, and the one or more metal oxides. The one or more carbon materials, clay, and the one or more metal oxides making up the mixture may individually be in the form of, for example, granules, powders, particles, pellets, cylinders, trochiodal shapes, flakes, beads, rings, irregular shapes, extruded structures, matrices, honeycomb structures, meshes, helixes and combinations thereof. Any of these shapes can be provided in a generally solid form or a partially or completely hollow form. Thus, for example, the adsorbent composition may comprises the carbon material(s), clay, and metal oxide(s) first individually formed into their desired shapes and sizes. These individually formed materials are subsequently mixed together to form the adsorbent composition. As such, a uniform or generally uniform mixture comprising approximately all the same shapes and/or size of individual materials can be provided. Alternatively, a non-uniform mixture comprising a variety of shapes and/or sizes of individual materials can be provided. The adsorbent composition, as such, can be provided in a packed bed or the like, and the contaminated gas can be passed through the adsorbent composition for removal of the target contaminant(s).

According to another embodiment of the present invention, the adsorbent composition comprises a mixture of carbon material(s), clay, and metal oxide(s), which is subsequently formed into one or more desired shapes. For example, the carbon material(s), clay, and metal oxide(s) are first mixed together, followed by optional pulverizing or grinding to provide a fine particular or granular form. The combined materials are then subsequently molded or otherwise formed into one or more desired shapes (e.g., pellets, cylinders, trochiodal shapes, flakes, beads, rings, irregular shapes, extruded structures, matrices, honeycomb structures, meshes, helixes and combinations thereof) and sizes to form the adsorbent composition.

According to another embodiment, the adsorbent composition is in the general form of a base material with one or more materials held or supported by or on the base material (hereinafter referred to as a "supported material"). In particular, the supported material may added to or combined with the base material so that the end product comprises a base material to which the supported material has been incorporated as a coating, has been adhered, bound and/or otherwise dispersed as adherent particles, granules or the like.

The base material itself can be provided in a variety of shapes, forms and sizes, including, but not limited to, granules, powders, particles, pellets, cylinders, trochiodal shapes, flakes, beads, rings, irregular shapes, extruded structures, matrices, honeycomb structures, meshes, helixes and combinations thereof. Any of these shapes can be provided in a generally solid form or a partially or completely hollow form. Depending upon the use of the adsorbent composition, the adsorbent composition can be provided as a single or small number or relatively large structure(s) (e.g., a single or small number of relatively large matrix or honeycomb structured base(s) with the supported material provided thereon), and the single or small number of structures can be provided for contact with a gas containing a target contaminant. Alternatively, the adsorbent composition can be provided as a plurality of relatively small structures (e.g., a plurality of relatively small granules, powders, particles, pellets, cylinders, trochiodal shapes, flakes, beads, rings, irregular shapes, extruded structures, matrices, honeycomb structures, meshes, helixes, etc. structured base(s) with the supported material provided thereon), and a plurality of the relatively small structures can be provided in a packed bed or similar arrangement for contact with a gas contaminated with a target contaminant.

Generally, the supported material preferably provides for a bulk of the target contaminant removal. The base material can be a passive base material, wherein it primarily or solely functions to support the supported material. Alternatively, the base material can be an active base material, wherein it is structured and/or fabricated of a material that provides for attraction/binding of and removal of one or more target contaminants, particularly hydrogen sulfide.

According to one embodiment, the adsorbent composition includes a first base material with a first supported material, and a second base material with a second supported material. In this embodiment, the first and second base materials are formed of different materials, and the first and second supported materials can be formed of the same or different materials. The materials used as first and second supported materials will generally depend upon the environment in which the adsorbent composition is used and the desired target contaminant(s). For example, if it is desired to target multiple target contaminants, one of the supported materials may be particularly effective in removing one or more of the target contaminants, while the other supported material may be particularly effective in removing one or more other target contaminant(s). On the other hand, if a single contaminant is the target, both of the supported materials may be the same. Further, in some embodiments, a supported material may be selected based upon the particular base materials it is used with (e.g., depending upon how the base and support materials interact with each other, whether particular support materials are more easily combined with particular base materials, whether particular combinations of base and support materials act synergistically to enhance target contaminant removal, etc.). As such, the supported materials are further selected in light of the particular base material(s) that will support them.

According to an exemplary embodiment, the first base material is formed of a carbon material, the second base material is formed of clay, and the first and second supported materials are both metal oxide materials. The first and second base/supported materials are then mixed to form the adsorbent composition of the invention.

According to another embodiment, the adsorbent composition includes a base material that comprises a combination of the one or more carbon materials and clay, and the one or more metal oxides form the supported material. In another embodiment, clay forms the base material, and the one or more metal oxides and the carbon material form the supported material. In another embodiment, the carbon material forms the base material, and the one or more metal oxides and the clay form the supported material. However, for the removal of a target contaminant from a gas, it is generally most effective to use the carbon material and/or clay in forming the base material and the metal oxide in forming the supported material. This allows for optimum exposure of the contaminant in a gas to the metal oxide material(s), which generally provide a bulk of the contaminant removal capacity. However, it is possible to utilize the metal oxide(s) in forming the base material, if desired.

The combination of the base material and the supported material can be provided in a variety of forms and methods. According to some embodiments, the base material is surface-modified by the supported material. The base material may be provided with the supported material coating at least a portion of one or more surfaces of the base material. This can be accomplished, for example, by spraying a liquid solution containing the supported material onto the base material and subsequently drying or curing as needed, or by dipping the base material into a solution bath containing the supported material and subsequently drying or curing as needed. The base material may be provided with the supported material impregnated or embedded in the base material. The supported material may be chemically or otherwise physically bound to one or more surfaces of the base material. Further, the supported material can be dispersed within the base material. Any combination of these options is also possible. Preferably, prior to addition of the supported material, the base material may be oxidized so as to facilitate subsequent binding or attachment of the supported material. The specific manner in which the supported material and base material are combined is not particularly limited provided that a contaminated gas is capable of coming into contact with and interacting with the material(s) that adsorb one or more target malodorous compounds.

Generally, clay is a relatively inexpensive material in comparison to the carbon material and the metal oxides. As such, in all of the above-described embodiments, for purely economic reasons, clay would be ideal in forming a bulk of the adsorbent composition. However, clay provides a lower removal efficiency than either the carbon material or the metal oxides. In particular, a clay-based adsorbent composition would need to be in contact with a contaminated gas for a relatively long period of time to remove an adequate amount of a target contaminant. Further, a gas would generally require a high concentration of a target contaminant for it to be effectively removed from a gas using a clay-based adsorbent composition. Further, even if a contaminated gas is in contact with clay for a very long period of time, the amount of contaminant removal would likely not be as high as contaminant removal using the carbon material and/or metal oxides. As such, the adsorbent compositions must contain adequate amounts of carbon and metal oxides to provide for adequate removal of a target contaminant. According to preferred embodiments, in each of the above-described embodiments, the combination of carbon material(s), clay, and metal oxide(s) are provided in a suitable ratio that provides for effective and efficient removal of hydrogen sulfide from a gas containing hydrogen sulfide, while minimizing overall material costs.

Preferably, the metal oxide(s), clay and carbon material(s) are combined so that the end product (i.e., the adsorbent composition) contains about 20 wt % to about 40 wt % of metal oxide(s) based on total weight of the adsorbent composition, with the balance of about 60 wt % to about 80 wt % being clay and carbon material(s). As previously noted, clay is much less expensive than carbon material(s) but it provides a lower removal efficiency than the carbon material(s). As such, in applications in which removal efficiency outweighs the benefits of cost reduction, carbon material(s) can make up a larger portion of the adsorbent material. On the other hand, where cost reduction outweighs removal efficiency, clay can make up a larger portion of the adsorbent material.

According to an exemplary embodiment, the adsorbent composition comprises (1) a base carbon material with a metal oxide supported thereon, wherein the base carbon material comprises about 85-97 wt % and the metal oxide comprises about 3-15 wt % based on total weight of the carbon/metal oxide, and (2) a second base clay material with a metal oxide supported thereon, wherein the base clay material comprises about 95-98 wt % and the metal oxide comprises about 2-5 wt % based on total weight of the clay/metal oxide. However, depending upon the ultimate use of the adsorbent material, the amount of clay vs. the amount of carbon material(s) can vary significantly.

In all of the above-described embodiments, the ratios of adsorbent material components may also vary depending upon the environment in which the adsorbent composition is utilized. For example, when the adsorbent composition is utilized in an area where a contaminated gas possesses a very high concentration of hydrogen sulfide, it may be preferable to utilize a higher concentration of clay than in areas where the contaminated gas possesses lower concentrations of hydrogen sulfide. Rather, in such low concentration environments, the adsorbent composition would beneficially be provided with a higher percentage of carbon and metal oxide materials. Likewise, in high throughput environments, wherein large quantities of contaminated gas must be treated in a relatively short period of time, the concentration of clay would generally be on the lower range, while concentration of carbon and metal oxides would be in the higher ranges.

In addition to the three main components noted herein (i.e., carbon materials, clay and metal oxides), one or more additives that are conventionally provided in adsorbent media may be further included in the present composition, including but not limited to, colorants, binders, and UV inhibitors.

Any conventional methods for removal of contaminants from a gas can suitably be used in the present invention, including but not limited to, packed columns, plate columns, spray chambers, spray towers, cyclonic spray chambers, and combinations thereof. Thus, for example, when the adsorbent composition is provided in a packed column, the adsorbent composition is provided in a shape, form and size that allows for placement of the adsorbent composition within the column in the desired packed configuration and so as to allow for the gas feed to be efficiently and effectively passed through the packed adsorbent composition. In such a configuration, as the particle size of the composition becomes smaller, the access to the surface area and the rate of adsorption becomes better. However, this also causes a pressure drop due to the small-sized packed particles which results in less space between the packed particles through which the gas can flow. Thus, these factors need to be weighed to provide an adsorbent composition size, shape and form that will effectively and efficiently adsorb the target materials from a gas feed without requiring excessive force to feed the gas through the adsorbent composition.

According to various embodiments, the adsorbent composition is used in a gas purification process by providing the adsorbent composition in a reactor through which a gas feed is passed, the gas feed containing at least hydrogen sulfide as an impurity. For example, the invention can include an apparatus for use in purifying a gas feed by removal of one or more impurities, wherein the apparatus comprises a flow path for a gas feed containing hydrogen sulfide as an impurity, wherein the flow path has a feed direction, and an adsorbent for hydrogen sulfide is positioned within the flow path.

For example, according to various embodiments, the adsorbent composition is loaded into a reaction chamber or column directly (e.g. packing the chamber or column with the adsorbent composition), or may be loaded into a reaction chamber or column that contains one or more filter beds which contain one or more layers of the adsorbent composition packed therein. The gas is then fed into the column at one end (e.g., through a bottom end for a vertical chamber or a side end for a horizontal chamber) so as to pass through the chamber and the adsorbent composition disposed therein. As the gas feed passes through the adsorbent composition, one or more contaminants, at least including hydrogen sulfide, interact with the carbon material(s), clay, and metal oxide(s) such that the hydrogen sulfide (and, in some embodiments, one or more additional contaminants) is held, bound or otherwise attached thereto and removed from the gas feed. The gas exiting the reaction chamber or column is, thus, at least partially depleted of hydrogen sulfide (and, in some embodiments, one or more additional contaminants). According to various embodiments, one or more pumps or other mechanisms are provided so as to provide an adequate force by which the gas is fed into and through the reactor.

According to various embodiments, the reactor is in the form of a compound-size bed, in which two different particle sizes of adsorbent composition are arranged in series. Such an arrangement can be beneficial in achieving enhanced removal efficiency through the use of a plurality of different-sized adsorbent composition. According to various other embodiments, the reactor is in the form of a compound-type bed, in which two or more types of adsorbent compositions (e.g., having different components) are provided in series. Such an arrangement can be beneficial in achieving removal of multiple contaminants through the use of a first adsorbent composition that is provided to specifically target one or more first contaminants (e.g. hydrogen sulfide), and a second adsorbent media that is provided to specifically target one or more different contaminants.

According to an exemplary embodiment, a gas purification process and apparatus/system is provided in which a contaminated gas is first passed through an adsorbent material having a higher concentration of clay based material relative to the carbon based material (where the amount of carbon based material approaches zero). Subsequent to passing the gas through this adsorbent material, the purified gas may pass through a system to detect the amount of target contaminant(s), particularly hydrogen sulfide, remaining in the purified gas. If the level of target contaminant(s) is higher than a predetermined level (i.e., an acceptable contaminant level), then the purified gas can then be fed through a second stage of purification using either the same type of adsorbent material that was previously utilized or by using an adsorbent material having a higher concentration of carbon based material to provide for more effective removal of the target contaminant(s). By utilizing a first (and sometimes the only) adsorbent media composition having a higher concentration of less expensive material, followed by a second (only if necessary) adsorbent media composition having an increased concentration of more expensive material, overall costs can be decreased. In particular, such a gas purification process and apparatus utilizes a small amount of expensive adsorbent media materials and only increases the amount of those expensive materials if necessary.

It is also possible to analyze an environment in which the gas purification process and apparatus is utilized (e.g., by performing tests which determine the total average gas flow, concentration of target contaminant(s), etc.) and to determine how many purification steps may be necessary, what the relative levels of clay based material to carbon based materials should be, whether increased levels of carbon material will be necessary in one or more of the purification steps, etc. without requiring an analysis step within the gas purification process. In other words, based on data acquired at a gas purification site prior to design of the adsorbent media compositions and purification steps/process, suitable adsorbent material composition(s) and number(s) of purification steps can be properly determined so as to provide a desired level of target contaminant(s) removal. Of course, in such systems, it is beneficial to have an exit analysis step in which the purified gas that has passed through the designed system is tested to ensure that it meets with the contaminant removal specifications. In the event that it does not meet with the specifications, the purified gas can either be re-fed through the purification apparatus or the adsorbent media can be modified (e.g., by increasing the amount of carbon based adsorbent material in one or more steps of the purification process or by increasing the number of purification steps).

The present adsorption process is beneficial because it can achieve removal of sulfur compounds, particularly hydrogen sulfide, at ambient pressures and temperatures. While the pressure and temperature at which the present method is carried out can be modified from ambient conditions (e.g., at heightened pressure and/or temperature), if desired, such modification is not necessary for effective removal of the target contaminants.

It will be apparent to those skilled in the art that various modifications and variations can be made to the structure of the present invention without departing from the scope or spirit of the invention.

In view of the foregoing, it is intended that the present invention cover modifications and variations of this invention provided they fall within the scope of the following claims and their equivalents.

What is claimed is:

1. An absorbent mixture for use in a gas purification apparatus having a flow path for a gas feed comprising:
    an absorbent mixture for absorbing hydrogen sulfide from a gas feed, where the absorbent mixture comprises:
    i. a first composition comprising a first metal oxide physically or chemically bonded to a surface of an activated carbon; and
    ii. a second composition comprising a second metal oxide chemically or physically bonded to a surface of a macroporous clay having pores of diameters greater than 50 nm through which a gas comprising hydrogen sulfide can pass, and wherein the macroporous clay comprises a reaction surface area of about 400 $m^2/g$ or more;
    where the absorbent mixture is configured to remove hydrogen sulfide from a gas feed flowing through a gas purification apparatus.

2. The absorbent mixture of claim 1, wherein the first composition comprises from about 85% to about 97% of the activated carbon and from about 3% to about 15% of the first metal oxide.

3. The absorbent mixture of claim 1, wherein the second composition comprises from about 95% to about 98% of the macroporous clay and from about 2% to about 5% of the second metal oxide.

4. The absorbent mixture of claim 1, wherein the macroporous clay has a pore volume of from about 0.1 $cm^3/g$ to about 0.5 $cm^3/g$.

5. The absorbent mixture of claim 1, wherein the first or second metal oxide is an oxide of iron, magnesium, or calcium.

6. The absorbent mixture of claim 1, wherein either or both of the first or second metal oxide is a combination of magnesium oxide and iron (Ill) oxide.

7. The absorbent mixture of claim 1, wherein the first and second metal oxides are the same.

8. The absorbent mixture of claim 1, wherein the first and second metal oxides are different.

* * * * *